United States Patent [19]
Urban

[11] 4,391,259
[45] Jul. 5, 1983

[54] FUEL CONDITIONER AND METHOD OF CONDITIONING FUEL TO AN INTERNAL COMBUSTION ENGINE THEREWITH

[76] Inventor: Milfred W. Urban, 1819 N. Edwards, Wichita, Kans. 67203

[21] Appl. No.: 266,332

[22] Filed: May 22, 1981

[51] Int. Cl.³ .................................................. F02M 15/00
[52] U.S. Cl. .................................... 123/557; 123/549; 123/593; 219/207
[58] Field of Search ................. 123/557, 549, 593; 165/51; 219/205, 206, 207

[56] References Cited

U.S. PATENT DOCUMENTS

| | | | |
|---|---|---|---|
| 1,380,824 | 6/1921 | Jarvis | 219/206 |
| 2,396,524 | 3/1946 | Nettel | 123/549 |
| 2,576,401 | 11/1951 | Kimmell | 123/549 |
| 2,851,027 | 9/1958 | Kivela | 123/549 |
| 3,306,273 | 2/1967 | Dolphin | 123/549 |
| 3,322,407 | 5/1967 | Brucar | 123/593 |
| 3,373,726 | 3/1968 | Albrecht | 123/549 |
| 3,498,279 | 3/1970 | Seeley, Jr. | 123/549 |
| 4,106,454 | 8/1978 | Henlis | 219/206 |

Primary Examiner—Charles J. Myhre
Assistant Examiner—E. Rollins Cross
Attorney, Agent, or Firm—John H. Widdowson

[57] ABSTRACT

A fuel conditioner including a cylindrical conduit shell body having a pair of compression connection ends. The shell body has a heating chamber interposed between an entrance conduit and an exit conduit. An overmold circumscribes the shell body. A pair of agitating screens are oppositely situated with respect to each other in the heating chamber. A pair of electrical conduits passes through the overmold and the shell body and are interconnected in series by a heating coil within the heating chamber. The method of conditioning fuel comprises agitating the fuel prior to its entrance into the heating chamber, heating the fuel within the heating chamber, and agitating the fuel as it leaves the heating chamber.

3 Claims, 6 Drawing Figures

U.S. Patent      Jul. 5, 1983      4,391,259
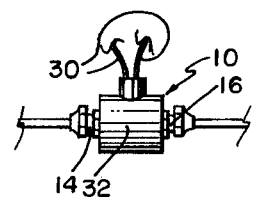
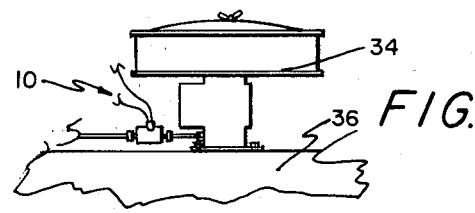
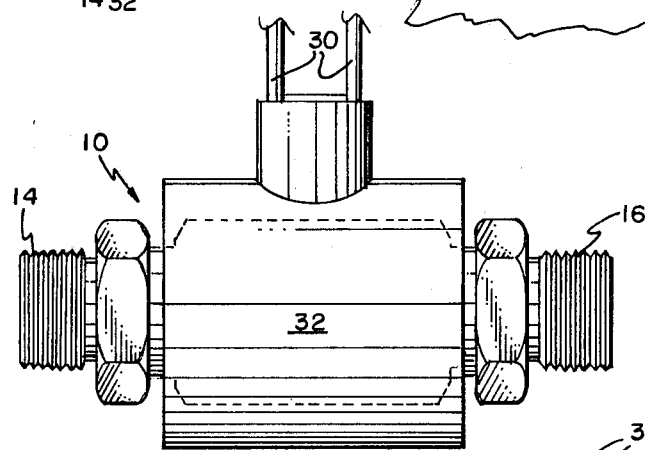
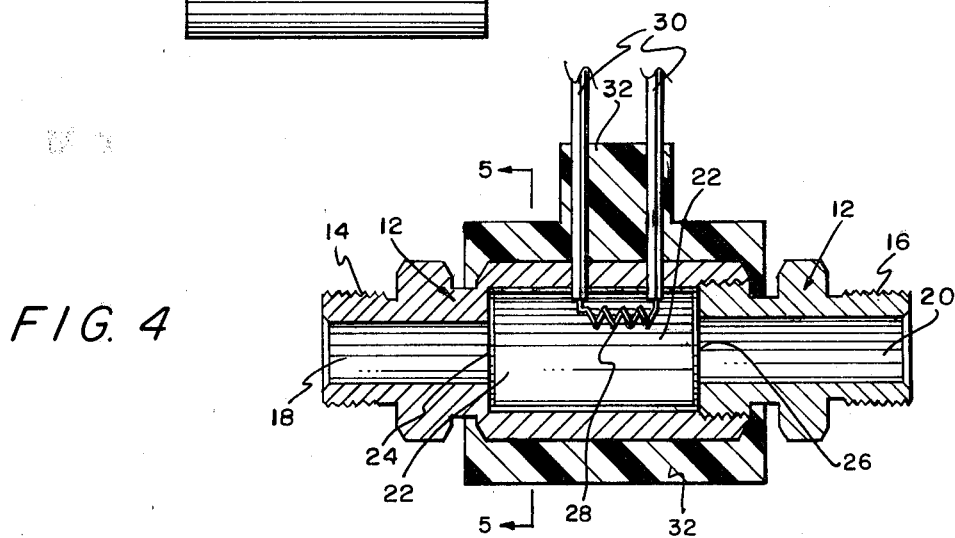
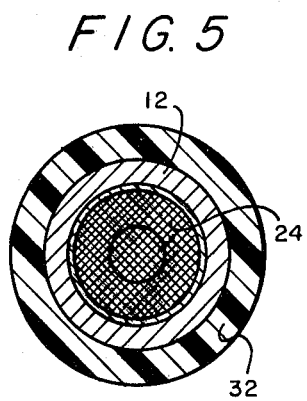
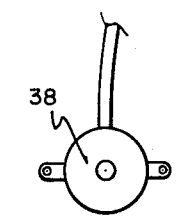

ND METHOD OF
FUEL CONDITIONER AND METHOD OF CONDITIONING FUEL TO AN INTERNAL COMBUSTION ENGINE THEREWITH

BACKGROUND OF THE INVENTION

1. Field of the Invention

This invention is related to conditioning fuel prior to ignition. More specifically, this invention provides a fuel conditioner and a method of conditioning fuel to an internal combustion engine.

2. Description of the Prior Art

U.S. Pat. No. 2,576,401 by Kimmell teaches an electric carburetor heater wherein fuel is percolated when the heater is actuated in response to thermostatic control included in the electrical system. U.S. Pat. No. 3,373,726 by Albrecht also discloses a fuel heater incorporated in the intake system of a vehicle engine. U.S. Pat. No. 3,498,279 by Seeley, Jr. teaches a fuel vaporizer disposed adjacent to the carburetor throat and which receives fuel through a line so that the same may be conducted in intimate contact with heat exchange means surrounding an electrical heating coil before the fuel passes into the carburetor throat through a discharge tube. U.S. Pat. No. 1,463,774 by Godman et al and U.S. Pat. No. 2,139,777 by Skok et al disclose additional types of electrical heating coils disposed in the intake manifold of an internal combustion engine. None of the foregoing prior art teaches or suggests the particular fuel conditioner and particular method of conditioning fuel of this invention.

SUMMARY OF THE INVENTION

This invention accomplishes its desired objects by providing a fuel conditioner comprising a conduit shell body having a pair of compression connector ends. The shell body has a structure defining a fuel entrance conduit, a fuel exit conduit and a heating chamber interposed between the entrance conduit and the exit conduit and in communication with each. A first agitating screen means and a second agitating screen means respectively cover the point of communication opening of the entrance conduit and the exit conduit with the heating chamber. A pair of electrical conduit means passes through the shell body into the heating chamber. A heating coil means electrically attaches in series to the ends of the pair of electrical conduits in the heating chamber. Electrical power means engages the other ends of the electrical conduits for energizing the heating coil means. The process for conditioning fuel to an engine flowing between the fuel source and the ignition area for the fuel in the engine comprising the steps of: passing the flowing fuel through a first agitation zone; and expanding subsequent to passing the flowing fuel from the agitation zone into a heating chamber zone to lower the flow velocity of the fuel simultaneously to additionally agitating the fuel in preparation to heating the same. Subsequently, the expanded, additionally agitated fuel is heated in the heating chamber zone. Finally, the heated fuel is passed through a second agitation zone while simultaneously increasing the flow velocity of the heated fuel in order to finally agitate the heated fuel prior to introducing the fuel into the ignition area of the engine.

It is an object of the invention to provide a fuel conditioner.

Still further objects of the invention reside in the provision of a method for conditioning fuel between the fuel supply and the ignition area of the engine.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 1 is a side elevational view of the fuel conditioner in the fuel line of an internal combustion engine;

FIG. 2 is a side elevational view of the fuel conditioner in the fuel line of a diesel engine;

FIG. 3 is an exploded side elevational view of the fuel conditioner;

FIG. 4 is a vertical sectional view of the fuel conditioner disclosing the heating coil in the heating chamber;

FIG. 5 is a vertical sectional view taken in direction of the arrows and along the plane of line 5—5 in FIG. 4; and FIG. 6 is a top plan view of a vacuum switch which may be used to activate the invention.

DETAILED DESCRIPTION OF THE INVENTION

Referring in detail now to the drawings, wherein similar parts of the invention are identified by like reference numerals, there is seen a reversible fuel conditioner, generally illustrated as 10, having a conduit shell body (see FIG. 4), generally illustrated as 12, which includes compression connection ends 14 and 16. The shell body 12 has a fuel entrance conduit 18, a fuel exit conduit 20, and (in a preferred embodiment) a generally cylindrical heating chamber 22 interposed between conduits 18 and 20 and in communication with each. Agitating screens 24 and 26 respectively cover the point of communication opening of the entrance conduit 18 and exit conduit 20 with the heating chamber 22. The point of communication opening of the fuel entrance conduit 18 has a diameter smaller than the diameter of the generally cylindrical heating chamber 22 in order to additionally agitate the fuel (other than by agitation screen 24) through expansion and to lower the flow velocity of the fuel as it passes through screen 24 into the heating chamber 22. Lowering of the flow velocity of the fuel allows the fuel to spend adequate time in the heating chamber 22 to be heated by a heating coil 28 electrically attached in series to electrical conductors 30—30 which engage a power means (i.e. a 12 volt battery or the like), not shown in the drawings, to energize the coil 28. An overmold 32 circumscribes the structural portion of the shell body 10 that defines the heating chamber 22 and, as illustrated in FIG. 4, electrical conductors 30-30 pass through the overmold 32 and the shell body 12. The point of communication opening of the fuel exit conduit 20 has a diameter smaller than the diameter of the generally preferred cylindrical heating chamber 22 in order to increase the velocity of the heated fuel as it passes through the agitating screen 26 into the exit conduit 20 prior to being introduced into carburetor 34 (ignition area of fuel) situated on internal combustion engine 36, or prior to introduction into the compression chamber of a diesel engine (not shown in the drawings) which is the ignition area for a diesel engine. In a preferred embodiment, vacuum switch 38 (see FIG. 6) is electrically connected to the power source (i.e. a battery); one of the pair of electrical conductors 30—30 connects to vacuum switch 38 and the other to ground on the engine 36 or the power source to provide automatic heating of the fuel in the heating chamber 22 through activation of the vacuum switch 38 with vacuum being supplied from the engine 36 when the engine 36 is operating.

With continuing reference to the drawings for operation of the invention and the method for conditioning fuel to an engine flowing from a fuel source and the fuel ignition area in the engine, fuel is pumped from the fuel source (i.e. gas tank) through a fuel line to be conditioned by the fuel conditioner 10 prior to entering the carburetor 34 (or the compression chamber of a diesel engine). The conditioner 10 conditions the fuel to protect the engine 36 (or diesel engine) against thickening of fuel, ice formation from water in the fuel, as well as adding heat to the fuel. The fuel to be conditioned enters entrance conduit 18 and passes through agitating screen 24. Immediately after passing the fuel through agitating screen 24, it is preferred to lower the flowing velocity of the fuel and to additionally agitate the fuel; this is accomplished by providing the heating chamber 22 with a diameter larger than the fuel entrance conduit 18 in order that the expansion of the fuel into the larger diameter chamber 22 after leaving agitating screen 24 additionally agitates while lowering the velocity of the fuel. By lowering the velocity of the fuel passing into the heating chamber 22 for heating by the coil 28 being energized via direct current power from a battery through electrical conductors 30—30, the fuel is given a longer residence time within the chamber 22 (and this optimumly heats the fuel more efficiently). In a preferred embodiment of the invention, the maximum temperature of the coil is about 392° F., and the maximum temperature of the fuel exiting the chamber 22 is about 274° F. After the expanded-additionally agitated fuel has been heated within chamber 22, it should be additionally agitated again while simultaneously increasing the flow velocity of same prior to introducing the heated-agitated fuel into the ignition area of an engine. This is accomplished by passing the expanded-additionally agitated heated fuel through agitating screen 24, and immediately subsequent to this passage, flowing the fuel leaving screen 24 into the exit conduit 20 which has a smaller diameter than the diameter of the heating chamber 22. It is somewhat critical to increase the velocity of the fuel from the chamber 22 for better performance of the engine 36.

Thus, by the practice of this invention, the solid state electric fuel conditioner 10 provides a means of heat to the desired temperature. It can be self-limiting and/or controlled via means of thermostat, manually operated or automatic control. The conditioner 10 is energized by means of current that is supplied from a generating source and/or battery or connections protected via in-line fuse or breaker (between the battery and the vacuum switch 38). It may be acitivated by means of the vacuum switch 38 with vacuum being supplied from the engine 36 only when the engine 36 is operating and/or manually via an "ON/OFF" switch and/or only when the ignition switch is in the "ON" position. The series of screens 24,26 along with the fuel expansion creates agitation of the fuel as it moves between its source of supply and its being ignited in the engine 26. This controlled temperature level and agitated condition results in better performance of the fuel thereby improving power, efficiency, cleanliness and emissions of the engine 36.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A fuel conditioner comprising a conduit shell body having a pair of compression connection ends; said shell body having a structure defining a fuel entrance conduit, a fuel exit conduit and a heating chamber interposed between the entrance conduit and the exit conduit and in communication with each; a first agitating screen means and a second agitating screen means respectively covering the point of communication opening of the entrance conduit and the exit conduit with the heating chamber; a pair of electrical conduit means passing through said shell body into said heating chamber; a heating coil means electrically attached in series to the ends of said pair of electrical conduits in said heating chamber; and electrical power means engaging the other ends of said electrical conduits for energizing the heating coil means, said fuel entrance conduit and said fuel exit conduit are essentially aligned in the same plane and directly opposed with respect to each other; said heating chamber is generally cylindrical, said point of communication opening of said fuel entrance conduit has a diameter smaller than the diameter of said generally cylindrical heating chamber in order to additionally agitate the fuel through expansion and to lower the flow velocity of same as the fuel flows through said first agitating screen means into the heating chamber, said lowering of said flow velocity allows the fuel to spend adequate time in said heating chamber to be heated by the heating coil; said point of communication opening of the fuel exit conduit has a diameter smaller than the diameter of the generally cylindrical heating chamber in order to increase the velocity of the heated fuel as it passes through the second agitating screen means into the exit conduit of the shell body; an overmold means circumscribing the shell body, said electrical conduit means passing through said overmold means; and said overmold means circumscribes the structural portion of said shell body that defines the heating chamber.

2. The fuel conditioner of claim 1 additionally comprising a vacuum switch means electrically connected to said power means, one of said pair of electrical conduits connected to said vacuum switch means and the other to ground on the engine or the power means to provide automatic heating of the fuel in the heating chamber through activation of the vacuum switch with vacuum being supplied from the engine when the engine is operating.

3. A method for conditioning fuel to an engine flowing between the fuel source and the fuel ignition area in the engine comprising the steps of:
(a) passing the flowing fuel through a first agitation zone which is a first screen;
(b) expanding immediately subsequent to the passing step (a) the flowing fuel from the agitation zone into a heating zone having an electrical coil means energized by a pair of conductors conducting power from a power source to lower the flow velocity of the fuel simultaneously to additionally agitating the fuel in preparation to heating the same;

(c) heating up to a maximum temperature of 274° F. the expanded-additionally agitated fuel of step (b) in the heating zone;

(d) passing subsequent to said heating step (c) the heated fuel through a second agitation zone which is a second screen while simultaneously increasing the flow velocity of the heated fuel in order to finally agitate the heated fuel prior to introducing the fuel into the ignition area of the engine;

(e) said first and second screen are essentially aligned in the same plane and directly opposed with respect to each other and respectively agitate the fuel prior to expanding step (b) and simultaneously to increasing velocity step (d); and (f) activating said power source by a vacuum switch means to provide automatic heating of the fuel in the heating zone through activation of the vacuum switch with vacuum being supplied from the engine when the engine is operating.

* * * * *